United States Patent [19]
Jones

[11] 3,885,377
[45] May 27, 1975

[54] CROP DIVIDER FOR HARVESTER

[75] Inventor: Ralph D. Jones, Pana, Ill.

[73] Assignee: Nor-Lo Engineering Co., Assumption, Ill.

[22] Filed: Mar. 8, 1974

[21] Appl. No.: 449,215

[52] U.S. Cl. .................................. 56/314
[51] Int. Cl. ............................. A01d 63/00
[58] Field of Search ............ 35/314, 315, 318, 319, 35/320, 17.3

[56] References Cited
UNITED STATES PATENTS
2,688,226  9/1954  Kittelson .......................... 56/314 X FOREIGN PATENTS OR APPLICATIONS
960,371  6/1964  United Kingdom .................. 56/314
921,279  1/1947  France .................................. 56/314

Primary Examiner—Louis G. Mancene
Assistant Examiner—J. N. Eskovitz
Attorney, Agent, or Firm—Koenig, Senniger, Powers and Leavitt

[57] ABSTRACT

A crop divider for use on a harvester for separating the crop to be harvested in the path of the harvester from unharvested crops immediately adjacent the path of the harvester and for preventing the crop from entangling in the harvester and from forming large masses or slugs of crop in the harvester which may hinder operation of the harvester. The crop divider of this invention comprises a generally vertical member secured to the harvester at each end of its cutter reel extending substantially forwardly thereof. The divider has a first crop dividing edge sloping upwardly and rearwardly from the forward end of the crop divider and a second crop dividing edge continuous with the first mentioned edge sloping abruptly upwardly from the first mentioned edge forward of the rotary axis of the cutter reel and extending substantially thereabove. The first crop dividing edge causes crops in line with the crop divider in extending the crops in line with the crop divider to be lifted upwardly as the harvester moves forward thereby to separate and untangle the majority of the crop. The second crop dividing edge causes crop not separated by the first crop dividing edge to abruptly move upward along the second edge and/or to be forcefully pulled forwardly as the harvester moves forward to insure that all the crop is separated prior to the crop being cut.

5 Claims, 2 Drawing Figures 3,885,377

CROP DIVIDER FOR HARVESTER

BACKGROUND OF THE INVENTION

This invention relates to harvesters for harvesting small grain crops and the like such as wheat, soy beans etc., and more particularly to such crop divider for untangling crops in the path of the harvester from other crops immediately adjacent the path of the harvester and thus preventing entangling of the crops in the harvester and preventing the formation of large masses of slugs of crops in the harvester which may foul operation of the harvester.

Conventional harvesters include a cutter bar for cutting crop to be harvested in the path of the harvester, a horizontal rotary reel mounted above and slightly forward of the cutter for directing the crop toward the cutter, and a divider on each side of the harvester extending forwardly of the cutter for separating the crop in the path of the harvester from the rows of crops adjacent thereto. Standard dividers are generally triangular in side elevation and extend forwardly of the cutter a relatively short distance (about 18 inches) and above the cutter to about the height of the crop. These standard dividers are not effective in separating or untangling crops, especially crops such as soy beans having viney stalks which are severely entangled.

With conventional harvesters, tangles of the crop often form at the ends of the platform immediately behind the cutter bar as the harvester moves through the field. If the crop being harvested is not untangled and separated from the adjacent crop, large masses or slugs of the crop may form at the ends of the platform and the uncut crop in the adjacent rows may cause the masses of tangled crop to become entangled in the rotary cutter reel of the harvester or in other harvester mechanisms, or may cause the mass of entangled crop to spill over the edge of the crop divider. This spill-over may result in loss of crops and may present problems in the next pass through the field when the harvester encounters a large slug of crop. Additionally, these entanglements of crop on the harvester platform may cause other crops to become entangled as they move into the harvester thus substantially reducing efficient operation of the harvester. These large slugs of crop in the ends of the platform often necessitates that the operator stop the harvester any physically remove the slug of entangled crop. Thus, the operating speed of the harvester is significantly reduced and in some situations exposes the operator to physical danger. Under some harvesting conditions (i.e., in harvesting extremely weedy fields or crops having viney stalks) it is sometimes necessary to stop the harvester with standard dividers and remove the entanglements as often as every 50 feet of forward travel of the harvester.

Specialized dividers for harvesters have been proposed for separating rows of tall crops, such as corn from shorter crops such as soy beans, planted with the corn. Large crop dividers for harvesters having the same general shape (i.e., triangular in side elevation) as the standard crop dividers are known. However, these enlarged dividers have not satisfactorily separated all crop entanglements and have not solved the problem of spill-over. Reference may be made to such U.S. Pat. Nos. as 2,349,905, 2,989,934 and 2,966,024 illustrating various prior art crop dividers.

SUMMARY OF THE INVENTION

Among the several objects of this invention may be noted the provision of an improved harvester crop divider for effectively separating and untangling crops in the path of the harvester from crops immediately adjacent the path of the harvester thus preventing fouling of the harvester; the provision of such a crop divider which insures that substantially all the crop in the path of the harvester is untangled from the crop immediately adjacent from the path of the harvester; the provision of such a crop divider which may be readily attached to conventional harvesters in such manner that the crop divider is free to float on the ground for up and down movement in response to changing ground contours; the provision of such a crop divider which substantially eliminates crop spill-over losses; the provision of such a crop divider which is of rugged and economical construction, which has a long service life, and which is reliable in operation. Other objects and features of this invention will be in part apparent and in part pointed out hereinafter.

Briefly, a crop divider of this invention is adapted for attachment to a harvester for dividing crops to be harvested from crops immediately adjacent and entangled with the crops to be harvested as the harvester moves through a field so as to insure uniform feed of crop to the harvester and to prevent entanglement of crops in the harvester. The harvester generally has a cutter for cutting the crop to be harvested and a reel for directing the crop toward the cutter and into the harvester. This reel is rotary about a generally horizontal axis extending transversely of the direction of travel of the harvester. The divider of this invention comprises a generally vertically disposed member adapted for securement to the harvester adjacent the ends of the cutter reel and which extends forwardly of the cutter above the reel axis. The divider has a bottom edge adapted either to ride on the ground or to be spaced somewhat thereabove, this bottom edge extending substantially forwardly of the cutter. The divider includes a front portion having a front crop dividing edge angled upwardly and rearwardly from the forward end of the bottom edge for engaging the crop to be untangled and separated for lifting the crop as the harvester moves forwardly thereby to at least partially separate the crop to be harvested from adjacent crops. The divider also includes a generally vertical second portion positioned above the first portion having a second crop dividing edge continuous with and extending upwardly from the upper end of the first crop dividing edge. This second crop dividing edge is inclined to the horizontal at a much steeper slope than the first dividing edge whereby a crop not separated by the first dividing edge is caused to abruptly move upwardly along the second dividing edge and/or to be forcefully pulled forwardly as the harvester moves forward thereby to insure separation of the crop to be harvested from crops immediately adjacent thereto. The second crop dividing edge is spaced forwardly of the rotary axis of the harvester cutter reel and extends thereabove to insure separation of the crop prior to the crop being cut. The divider further includes means adapted for connection of the divider to the harvester adjacent one end of the cutter reel for enabling generally vertical swinging movement of the divider relative to the harvester about a generally horizontal axis extending transverse to the divider in response to changing ground contours thereby to prevent forward end of the divider from digging into the ground upon encountering changes in ground contour.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
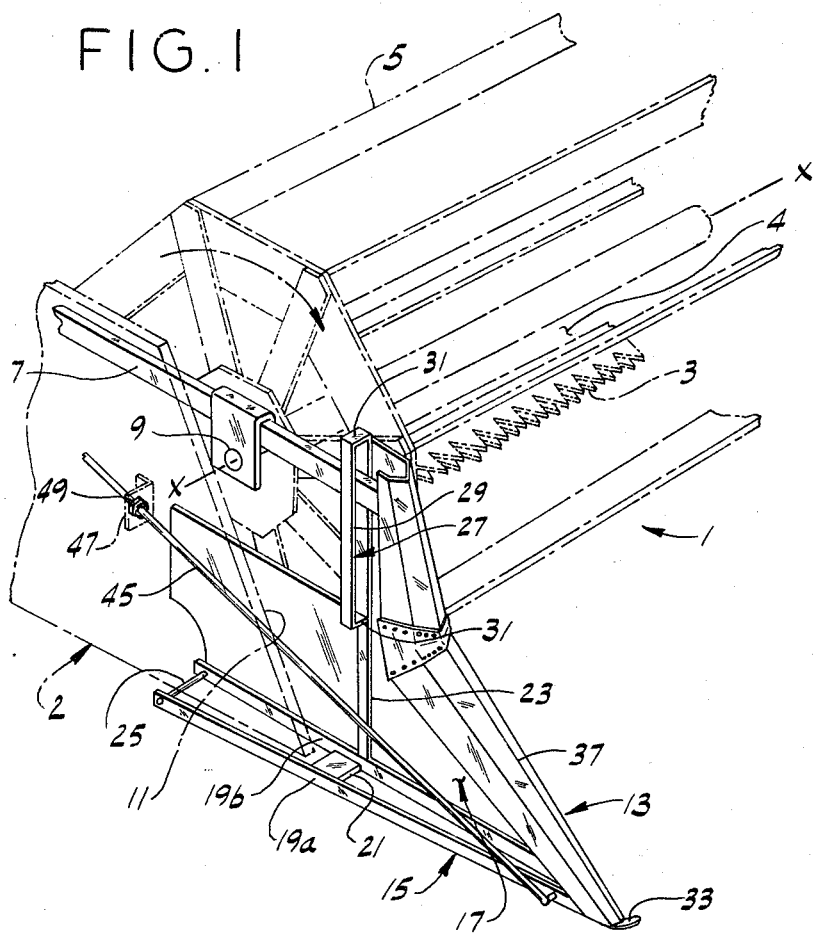
FIG. 1 is a perspective of a crop divider of the present invention showing the divider mounted on a portion of a conventional harvester (shown in phantom)

Referring now to the drawings, a conventional harvester, indicated in its entirety at 1 and shown in phantom in FIG. 1, includes a generally horizontal cutter bar 3, a platform 4 behind the cutter for receiving crop to be harvested, and a reel 5 rotary in the direction indicated by the arrow in FIG. 1 on a generally horizontal axis X—X so as to direct the crops to be harvested into the cutter and onto the platform. The harvester further includes a reel support arm 7 extending forwardly from the harvester and a reel bearing assembly 9 supported from the reel support arm and journalling the reel. As is conventional on many harvesters, a reel side end or divider 11 is rigidly secured to the harvester at each end of the cutter reel for directing crops into the harvester. As is shown, this reel side end extends forwardly of the axis X—X of reel 5 a relatively short distance (e.g., 18 inches).

In accordance with this invention, an improved crop divider indicated generally at 13 is shown to be a generally vertical member adapted to be attached to a respective side end 11 of the harvester outside the ends of reel 5 for dividing crops to be harvested from crops immediately adjacent to and entangled with the crops to be harvested as the harvester moves forwardly through a field. By untangling and separating the crop prior to the crop being cut, the crop may be uniformly fed into the harvester. Also, entanglements of the crops on the ends of reel 5 and the formation of slugs or large masses of entangled crops on platform 4 are substantially eliminated thereby permitting the harvester to be operated without stopping for clearing the reel and platform of entangled crops.

More particularly, divider 13 comprises a frame generally indicated at 15 and cover 17 of sheet metal or the like secured to the frame. More particularly, frame 15 comprises a pair of bottom frame members or runners 19a,19b joined together at their forward ends and spaced at their rear ends. A spacer 21 intermediate the ends of the frame members 19a,19b holds the frame members in fixed relation relative to one another. A vertical frame member 23 is secured, as by welding, to the runners intermediate their ends and extends upwardly therefrom. The rear ends of members 19a,19b have an aperture therein for reception of a pin 25. This pin is adapted to be inserted through holes (not shown) in reel end supports 11 for pivotal securement of divider 13 to the harvester so as to permit vertical swinging movement of the divider for purposes as will appear. Vertical frame members 23 has a guide box generally indicated at 27 secured to its upper end and comprises a guide bar 29 spaced from frame member 23 by connecting members 31 a distance slightly greater than the thickness of reel support arm 37 for purposes as will appear. Cover 17 is secured, as by riveting or welding, to the inner side (relative to the harvester) of frame 15.

Frame members 19a,19b constitute runners and define a bottom edge of the crop divider 13 of this invention for riding on the grounds or somewhat thereabove in front of the harvester. The forward ends of these front runners are bent up, as indicated at 33, to prevent them from digging into the ground upon encountering a change in ground contour.

Figure 2:
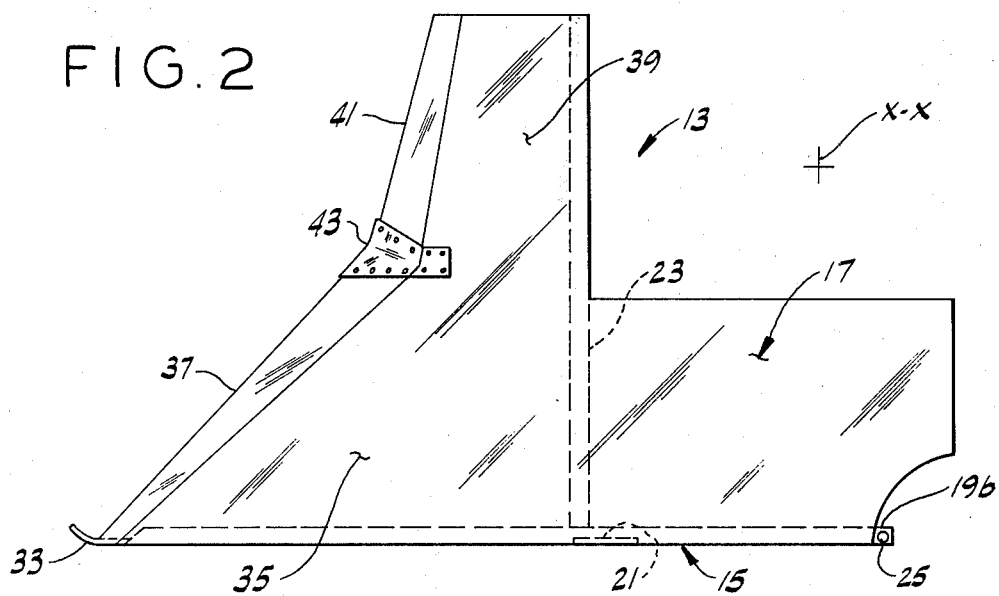
FIG. 2 is a side elevation of the divider of FIG. 1.

Crop divider 13 further comprises a first or lower portion 35 having a first or lower crop dividing edge 37 angling upwardly and rearwardly from tip 33 of the runners 19a,19b for engaging crops to be untangled and separated as the divider is moved forwardly along the ground in front of the harvester. The divider further comprises a second or upper portion 39 having a second or upper crop dividing edge 41 continuous with and extending upwardly from the upper end of crop dividing edge 37. This second crop dividing edge is inclined to the horizontal at a much steeper slopt (e.g., 70°–75°) than the first crop dividing edge for purposes as will appear. Cover 17 has a roll formed leading edge which constitutes crop dividing edges 37 and 41. This roll form edges is rolled toward the outside of the crop divider. This roll formed edge is relatively narrow at its bottom and top, and is substantially wider (e.g., 4–5 inches) at the juncture between crop dividing edges 37 and 41. A doubler plate 43 is riveted to sheet metal cover 17 on the roll formed edge at the juncture of crop dividing edges 37 and 41 to reinforce the cover at the juncture. As shown in FIG. 2, this juncture is substantially forward of and generally at the elevation of axis X—X.

As previously mentioned, divider 13 is secured to the harvester by means of pivot pin 25 so as to permit vertical swinging movement of the divider on the pin. Guide box 27 is adapted to slidingly receive the forward end of reel support arm 7. This guide box slides on the support arm and the latter prevents lateral side movement of the divider, but does permit vertical pivotal movement of the divider on pin 25. A rod 45 having a hooked forward end (not shown) is pivotally secured to the forward end portion of runner 19a and extends rearwardly and upwardly therefrom and passes through an aperture in a bracket 47 secured to harvester 1. A stop 49 is secured to the rod on the backside of bracket 47 and prevents downward swinging movement of the divider beyond a lowered ground engaging position, but freely permits upward pivotal movement of the divider. Thus, upon the divider encountering a change in ground contour, the divider is free to swing upwardly and is thus prevented from digging into the ground. The stop on rod 45 is adjustable whereby the lowered position of divider 13 may be so adjusted as to position runners 19a,19b slightly above the ground. With the divider in its lowered ground engaging position, it is free to swing upwardly on pin 25 upon encountering changes in ground contours and the divider may be said to float on or above the ground as the harvester moves forwardly.

In operation, upon encountering entangled crops, the tip 33 of divider 13 of this invention passes underneath the crops and the lower or front crop dividing edge 37 engages the crops and lifts the crops upwardly as the harvester moves forward. As the crop moves upwardly along the first dividing edge, the uncut crop on the inside of the divider begins to pull apart from the crop on the outside of the divider. Upon further movement of the harvester, the untangled crop not separated by the first dividing edge 37 encounters the second dividing edge 41. As specified, this second crop dividing edge is more vertical than the first crop dividing edge and exerts a substantial forward pulling force on the crop and causes an abrupt increase in upward movement of the crop relative to the forward movement of the harvester and exerts a substantially forward force on the crop to effectively separate the entangled crop. It will be understood that edge 41 could be nearly vertical in which case it would exert little or no upward force on the crop, but rather would pull it forwardly to untangle and separate the crop. Since this second edge is spaced forward of the above reel axis X—X, it positively insures that all the crop to be harvested is separated from the adjacent crop prior to the crop to be harvested being cut by cutter 3, and that crop spill-over is prevented. Thus, the harvester may be operated without having to periodically clear the reel and platform of slugs of tangled crop.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A crop divider adapted for attachment to a harvester or the like for dividing crops to be harvested from crops immediately adjacent and entangled with the crops to be harvested as the harvester moves through a field so as to insure uniform feed of crop to the harvester and to prevent entanglement of the crop in the harvester, said harvester having a cutter for cutting the crop to be harvested and a reel for directing the crop toward the cutter and into the harvester, said reel being rotary about a generally horizontal axis extending transversely of the direction of travel of the harvester forward of said cutter, said divider comprising a generally vertically disposed member adapted for securement to the harvester adjacent the ends of the cutter and reel and extending forwardly of the cutter and said axis and above said axis, said member having a bottom edge adapted either to ride on the ground or to be spaced somewhat thereabove, said bottom edge extending substantially forwardly of said cutter, a first portion having a first crop dividing edge angling upwardly and rearwardly from the forward end of said bottom edge for engaging the crop to be untangled and separated and for lifting said crop as the harvester moves forwardly thereby to at least partially untangle uncut crops to be harvested from adjacent uncut crops, a second generally vertical portion positioned above said first portion having a second crop dividing edge continuous with and extending upwardly from the upper end of said first dividing edge, said first and second dividing edges meeting at a junction substantially forward of and generally at the elevation of said axis with said second dividing edge being inclined to the horizontal at a much steeper slope than the first dividing edge so that the entangled crop is caused to abruptly move forwardly with and/or upwardly along the second dividing edge as the harvester moves forward thereby to insure separation of the crop to be harvested from the crops immediately adjacent thereto, said second dividing edge extending above said junction to insure separation of the crop prior to the crop being cut, and means adapted for connection of the divider to the harvester adjacent one end of said reel for enabling generally vertical swinging movement of the divider relative to the harvester about a generally horizontal axis extending transverse to the divider in response to changing ground contours thereby to prevent the forward end of the divider from digging into the ground upon encountering changes in ground contour.

2. A crop divider as set forth in claim 1 further comprising a frame including a pair of generally horizontal members joined at one end thereof constituting their forward end and spaced apart at their other end constituting their rearward end, said pair of members constituting said bottom edge of said divider, and a generally vertical member secured to at least one of said bottom frame members intermediate its ends.

3. A crop divider as set forth in claim 2 wherein said divider further comprises a cover secured to said frame, said cover having a roll-formed leading edge, constituting said first and second crop dividing edges.

4. A crop divider as set forth in claim 3 wherein said cover is secured to the inner face of said frame and is open on the outer side of the harvester, said roll form edge being rolled outwardly of the harvester.

5. A crop divider as set forth in claim 1 wherein said harvester has a generally horizontal reel support arm extending forwardly of said axis, said divider further comprising means engageable with said reel support arm for substantially preventing lateral movement of the divider with respect to said arm and for permitting said up and down swinging movement of the divider.

* * * * *